May 29, 1956 L. A. HARVEY 2,747,872
MAGNETIC FISHING GAME
Filed Oct. 13, 1952
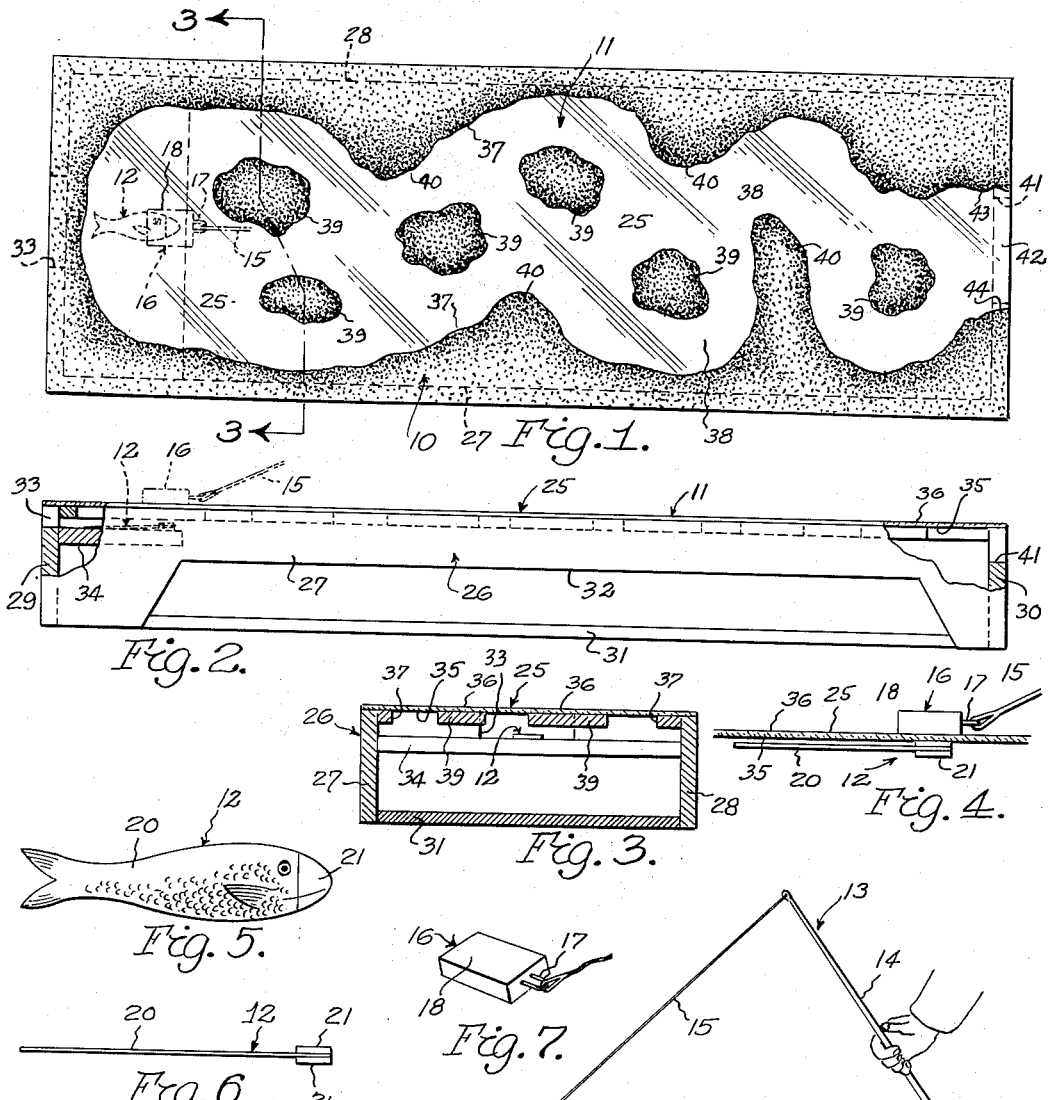
INVENTOR.
Louis A. Harvey
BY
Barthel & Bugbee
Attys

United States Patent Office 2,747,872
Patented May 29, 1956

2,747,872
MAGNETIC FISHING GAME
Louis A. Harvey, Detroit, Mich.

Application October 13, 1952, Serial No. 314,438

1 Claim. (Cl. 273—1)

This invention relates to games and, in particular, to fishing games.

One object of this invention is to provide a fishing game wherein a magnetically-attracted fish is drawn through a tortuous channel between various obstacles in an artificial fish pond by means of a magnetic fish bait placed on the opposite side of a transparent panel from the fish, so that skill and care must be employed in order to keep the fish within the grasp of the bait while drawing the fish along its path in the fish pond.

Another object is to provide a magnetic fishing game of the foregoing character wherein the fishing pond includes a horizontal transparent panel in the form of a plate or sheet and the fish is held against the underside of the panel by the magnetic bait placed on the upper side of the panel with the result that the player must be very careful in guiding the fish through the obstacles strewn in the channel or else the magnetic bait is pulled away from the fish to such an extent that its magnetic force fails to overcome the gravitational force on the fish, with the result that the fish drops away from the panel and the player "loses" the fish.

Another object is to provide a magnetic fishing game of the foregoing character wherein the obstacles are arranged as islands or other barriers secured to the underside of the transparent panel, the panel being elevated by means of legs or a box-like support so as to permit the fish to fall a sufficient distance to remove it from the field of influence of the magnetic bait.

Another object is to provide a magnetic fishing game of the foregoing character wherein the support for the transparent panel is provided at one location with an entrance opening for the insertion of the fish and at another location with an exit opening for withdrawing the fish if the player is successful in drawing the fish from one end to the other end of the tortuous channel in the fish pond without losing control of it.

Another object is to provide a magnetic fishing game as set forth in the object immediately preceding, wherein an additional opening is provided beneath the transparent panel for the removal of the fish when the latter has encountered an obstacle or has otherwise gone beyond the range of holding force of the magnetic bait so that it falls away from contact with the panel.

Other objects and advantages of the invention will become apparent during the course of the following description of the accompanying drawing, wherein:

Figure 1 is a top plan view of the fish pond of a magnetic fishing game, according to one form of the invention, with the magnetically-attracted fish and the magnetic bait shown in dotted lines;

Figure 2 is a side elevation of the fish pond shown in Figure 1, with the entrance and exit openings shown in vertical section;

Figure 3 is a cross-section taken along the line 3—3 in Figure 1;

Figure 4 is a fragmentary vertical section through the transparent panel of the fish pond of Figure 1, showing the fish and magnetic bait in side elevation in the positions which they occupy during the playing of the game;

Figure 5 is a top plan view of the magnetically-attracted fish used in the fishing game of the present invention;

Figure 6 is a side elevation of the fish shown in Figure 5;

Figure 7 is a perspective view of the magnetic bait with a fishing line attached; and Figure 8 is a perspective view of the magnetic fishing game of Figures 1 to 7 inclusive, showing the game being played.

Referring to the drawings in detail, Figure 8 shows a magnetic fishing game, generally designated 10, according to one form of the invention as consisting generally of a fishing pond 11, a magnetically-attracted fish 12, and a magnetic fishing tackle 13 which in turn includes a fishing pole 14, a fishing line 15 attached thereto, and a magnetic fish bait 16 attached to the fishing line 15. The fishing pole 14 and line 15 are of any suitable construction and the fishing line 15 is connected as at 17 (Figure 7) to the magnetic fish bait 18. The latter contains a magnet, preferably a permanent magnet, or it may consist entirely of the magnet itself without any external casing around it.

The magnetically-attracted fish 12 (Figures 5 and 6) consists of a body 20, preferably of sheet material, formed in the shape of a fish and either constructed of magnetic material, such as sheet iron or, if of non-magnetic material, having a magnetically-attracted portion 21 of iron or the like. In view of the fact that the fish 12 is preferably decorated as such on both sides, a magnetically-attracted portion 21 is preferably placed on both sides of the body 12 (Figure 6) and preferably located at the nose of the fish.

The fish pond 11 (Figures 1 to 3 inclusive) consists of a transparent panel 25 in the form of a sheet or plate of transparent material, such as glass, transparent plastic or other similar material supported in a generally horizontal but elevated position by a supporting structure, generally designated 26. The supporting structure 26 may consist merely of legs or feet (not shown) but for purposes of strength and utility it preferably is of box-like form having front and rear sides 27 and 28 (Figure 3), starting and finishing ends 29 and 30 (Figure 2), and a bottom panel 31 interconnecting the sides 27, 28 and ends 29, 30. The front side 27 (Figure 2) is provided with an elongated opening 32 through which "lost" fish 12 may be recovered. The starting end 29 is provided with an entrance opening 33 in the form of a slot arranged in close proximity to the transparent panel 25, for insertion of the fish 12 at the start of the game. Immediately adjacent the entrance opening 33 there is mounted a shelf or platform 34 which temporarily supports the fish 12 immediately after it has been inserted through the entrance opening 33 (Figure 2). The shelf or platform 34 preferably extends between the front and rear sides 27 and 28 (Figure 3) and is preferably also secured to the starting end 29 (Figure 2). The platform or shelf 34 is, like the entrance opening 33, placed in close proximity to the underside 35 of the transparent panel 25 within the range of holding force of the magnetic bait 16 placed on the upper side 36 of the panel 25.

In order to simulate the body of water, the transparent panel 25 has secured to the underside 35 thereof a border bank or shore 37 resembling the bank and surrounding the pond area 38 through which the fish 12 is drawn by the magnetic bait 16 during the playing of the game. To increase the skill necessary in playing the game, obstacles 39 in the form of islands or other barriers are also secured to the underside 35 of the panel 25, and the border or bank 37 of the pond may be provided with promontories or peninsulas 40 projecting outward into the pond area 38. The finishing end 30 of the supporting structure 26 is provided with an exit opening 41, also placed in close proximity to the underside 35 of the transparent panel 25, through which the fish 13 is drawn at the end of its course through the fish pond 11, in the event that the player is successful in holding the fish 12 against the panel 25 throughout the course. The exit opening 41 is placed adjacent a gap or passageway 42 between the spaced opposite portions 43 and 44 of the bank or shore 37 (Figure 1).

In playing the game, the player inserts a fish 12, nose foremost, through the entrance opening 33 (Figures 1 to 3 inclusive) so that it rests upon the shelf or platform 34 within sufficient distance of the panel 25 to be within the range of magnetic attraction of the magnetic bait 16. The player now places the bait 16 over the fish 12 on the platform or shelf 34, whereupon the nose portion 21 is attracted by the magnetic field from the magnetic bait 16 and pulled upward thereby into contact with the underside 35 of the transparent panel 25. The player now pulls the magnetic bait 16 along the upper side 36 of the transparent panel 25 by means of the fishing pole 14 and line 15 (Figure 8), drawing the fish 12 along the underside 35 thereof (Figure 4).

The player must be careful not to jerk the bait 16, or else he will inadvertently pull it beyond magnetic reach of the nose portion 21 of the fish 12, whereupon the latter will drop by gravity to the bottom 31 of the supporting structure 26 and the player has lost his fish. The lost fish may, however, be removed by inserting the hand or the fishing pole 14 through the elongated opening 32 in order to resume the game. The skill necessary in playing the game is also increased by the fact that the magnetic bait 16 slides easily over the upper surface 36 of the transparent panel 25, whereas the fish 12 may be provided, if desired, with a panel-contacting surface of increased friction to retard its ease of sliding along the underside or surface 35 of the transparent panel 25.

If the fish 12 collides with one of the islands 39, promontories 40 or the bank or shore 37 while the magnetic bait 16 is being drawn along the surface 36 of the panel 25, the magnetic bait 16 usually passes out of magnetic holding range of the fish 12 before the player can halt it, whereupon the weight of the fish 12 causes it to fall to the bottom 31 as soon as the gravitational downward force exceeds the magnetic holding force upward. If, however, the player is successful in drawing the fish 12 through the tortuous channel between the obstacles 37, 39, 40, he guides the fish 12 outward through the passageway 42 between the opposite portions 43 and 44 of the bank 37 and outward through the exit opening 41, winning the game or that portion thereof.

What I claim is:

A magnetic toy fish pond game comprising an open-centered upstanding panel-supporting structure, a horizontally-disposed transparent panel mounted on the upper part of said structure, an obstacle and barrier arrangement disposed adjacent the lower side of said panel and defining a tortuous open-bottomed passageway extending thereacross, a shelf mounted below said panel in closely-spaced relationship thereto with its inner end terminating short of the entrance to said passageway, said panel-supporting structure having an inlet opening therethrough from the exterior thereof to the space between said shelf and said panel; a toy fish of narrower width than said inlet opening and passageway having a magnetically-attracted portion therein, and a magnetic fish bait adapted to be placed on the upper side of said panel and having therein a magnet of sufficient power to lift from said shelf a fish inserted through said inlet opening and to hold said fish against the lower side of said panel against the counterpull of gravity thereon but of insufficient power to lift a fallen fish from the nearest horizontal surface underlying said shelf and panel, whereby the withdrawal of said magnetic fish bait from proximity to the fish by the collision of the fish with said obstacle and barrier arrangement while being drawn through said passageway by said magnet removes the magnetic sustaining force from said fish and causes the fish to be temporarily lost by falling downward onto the underlying surface beyond the lifting range of said magnet.

References Cited in the file of this patent

UNITED STATES PATENTS

| | | |
|---|---|---|
| 403,012 | Washburn | May 7, 1889 |
| 934,179 | Jackson | Sept. 14, 1909 |
| 1,225,787 | Diehl | May 15, 1917 |